United States Patent
Bae et al.

(10) Patent No.: US 11,381,885 B2
(45) Date of Patent: Jul. 5, 2022

(54) METHOD AND DEVICE FOR MANAGING PROCESSING OF MEDIA CONTENT, AND COMPUTER-READABLE RECORDING MEDIUM

(71) Applicant: Samsung Electronics Co., Ltd., Suwon-si (KR)

(72) Inventors: Jaehyeon Bae, Suwon-si (KR); Hyunkoo Yang, Suwon-si (KR); Eric Yip, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/299,157

(22) PCT Filed: Dec. 3, 2019

(86) PCT No.: PCT/KR2019/016925
§ 371 (c)(1),
(2) Date: Jun. 2, 2021

(87) PCT Pub. No.: WO2020/116896
PCT Pub. Date: Jun. 11, 2020

(65) Prior Publication Data
US 2022/0053244 A1    Feb. 17, 2022

Related U.S. Application Data

(60) Provisional application No. 62/774,547, filed on Dec. 3, 2018.

(51) Int. Cl.
*H04N 7/173* (2011.01)
*H04N 21/647* (2011.01)
(Continued)

(52) U.S. Cl.
CPC ......... *H04N 21/64784* (2013.01); *G06F 9/48* (2013.01); *H04N 21/6371* (2013.01)

(58) Field of Classification Search
CPC . H04N 21/64784; H04N 21/6371; G06F 9/48
See application file for complete search history.

(56) References Cited

U.S. PATENT DOCUMENTS 10,320,922 B1 * 6/2019 Hussain ............... G06F 9/45533
11,063,992 B1 * 7/2021 Sodagar ................. H04L 67/02
(Continued)

FOREIGN PATENT DOCUMENTS

KR    10-2018-0099206 A    9/2018
WO    2018/031070 A1    2/2018

OTHER PUBLICATIONS

Kyungmo Park et al., 'Use cases and requirements for NBMP (v4)', ISO/IEC JTC1/ SC29/WG11 MPEG2018/N17502, San Diego, US, Apr. 20, 2018.
Kyungmo Park et al., 'Call for Proposals on Network-Based Media Processing', ISO/IEC JTC1/SC29/WG11 MPEG2018/N17503, San Diego, US, Apr. 20, 2018.
(Continued)

*Primary Examiner* — Mulugeta Mengesha
(74) *Attorney, Agent, or Firm* — Jefferson IP Law, LLP

(57) ABSTRACT

A media content processing management method according to an embodiment of the disclosure includes: obtaining, from a network based media processing (NBMP) source, workflow information for media content processing; identifying whether to use a feedback task, based on the workflow information, obtaining, from a function repository, function information about a function of the feedback task or about a function of at least one media task for the media content processing, based on the workflow information, obtaining task information based on at least one of the workflow information and the function information, delivering the task information to each of tasks, obtaining client feedback information, and updating the task information based on the client feedback information, wherein the task information
(Continued)

includes at least one of input information, output information, configuration information, or connection information of each of the tasks, and the connection information includes connection information of a media processing task and the feedback task, the media processing task using client assistance information from among the at least one media task.

13 Claims, 15 Drawing Sheets

(51) Int. Cl.
  *G06F 9/48* (2006.01)
  *H04N 21/6371* (2011.01)

(56) References Cited

U.S. PATENT DOCUMENTS

| | | | |
|---|---|---|---|
| 2010/0250748 A1* | 9/2010 | Sivasubramanian | ........................ G06F 21/6209 711/170 |
| 2012/0158646 A1* | 6/2012 | Shafiee | ............ G06Q 10/06312 707/607 |
| 2016/0134677 A1 | 5/2016 | Mueller et al. | |
| 2018/0337763 A1 | 11/2018 | Shi et al. | |
| 2019/0034224 A1* | 1/2019 | Mitevski | ................. G06F 9/485 |

OTHER PUBLICATIONS

International Search Report and Written Opinion dated Mar. 23, 2020, issued in International Patent Application No. PCT/KR2019/016925.

\* cited by examiner

METHOD AND DEVICE FOR MANAGING PROCESSING OF MEDIA CONTENT, AND COMPUTER-READABLE RECORDING MEDIUM

TECHNICAL FIELD

The disclosure relates to a method and apparatus for transmitting multimedia content. More particularly, the disclosure relates to a method and apparatus for processing media by using user feedback information in a network based media processing (NBMP) scheme.

BACKGROUND ART

Network based media processing (NBMP) refers to a technology for providing a next-generation media service with low latency to a user terminal by enabling mobile edge computing located on a network or a content delivery network (CDN) to perform media processing, and when a media source transmits media data and a media processing workflow description to a media processing entity located on a network, the media processing entity performs a media processing workflow accordingly. The media processing workflow may be implemented by interoperation of one or more media processing entities.

DESCRIPTION OF EMBODIMENTS

Technical Problem

The objective of the disclosure is to provide various and user-adaptive media services to a user by applying, to a media processing workflow, a workflow description along with feedback information from a media sink (user terminal).

Solution to Problem

The disclosure provides a method and apparatus for a workflow manager to manage a workflow of tasks for processing media content so as to enable a media processing task to use feedback information delivered from a user terminal.

According to an embodiment of the disclosure, provided is a method of managing a workflow of tasks for processing media content in a network system.

According to an embodiment of the disclosure, provided is a computer-readable recording medium having recorded thereon a program for executing the method.

In addition, provided is a computer-readable recording medium having recorded thereon a computer program for executing another method, another system, and the method for implementing the disclosure.

Advantageous Effects of Disclosure

According to the disclosure, by using feedback information delivered from a user terminal so as to process media, network resources may be efficiently used, and expansion to various services may be provided.

Figure 1:
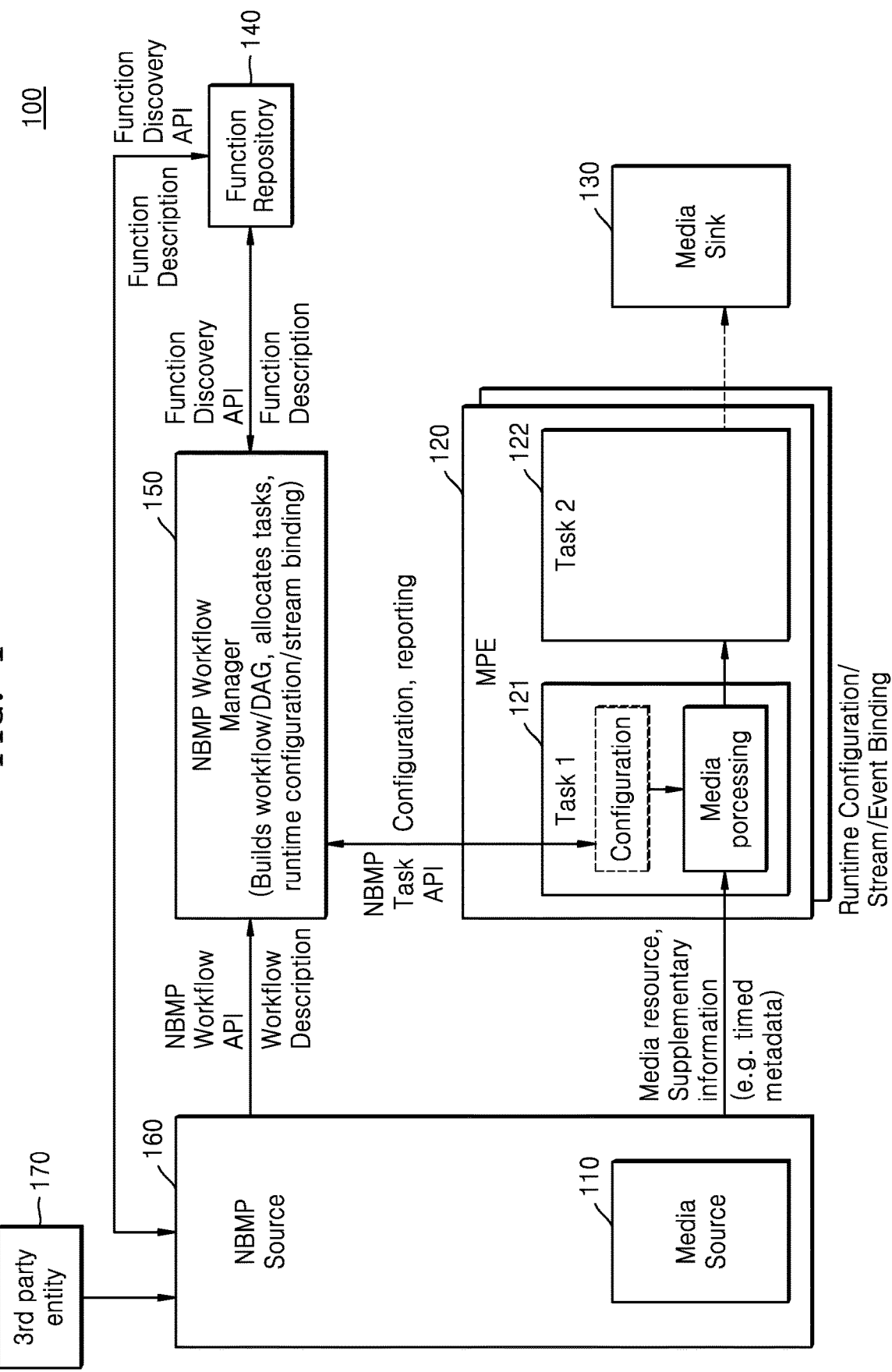
FIG. 1 illustrates architecture of a general network based media processing (NBMP) technology.

Table 1 shows an embodiment of a workflow descriptor.

Table 2 shows an embodiment of a resource of a workflow API.

Table 3 shows an embodiment of an operation of a workflow API.

Table 4 shows an embodiment of a client assistance descriptor.

Table 5 shows an embodiment of descriptions of geometric processing tasks for rendering processing of 6DoF content and inputs/outputs.

Table 6 shows an embodiment of a transcoding workflow description for generating a transcoding workflow Table 7 shows an embodiment of a transcoding task description.

BEST MODE

A representative configuration of the disclosure for achieving the objective is as below.

To solve the technical problem, a media content processing management method according to an embodiment of the disclosure includes: obtaining, from a network based media processing (NBMP) source, workflow information for media content processing; identifying whether to use a feedback task, based on the workflow information; obtaining, from a function repository, function information about a function of the feedback task or about a function of at least one media task for the media content processing, based on the workflow information; obtaining task information based on at least one of the workflow information and the function information; delivering the task information to each of tasks; obtaining client feedback information; and updating the task information based on the client feedback information, wherein the task information includes at least one of input information, output information, configuration information, or connection information of each of the tasks, and the connection information includes connection information of a media processing task and the feedback task, the media processing task using client assistance information from among the at least one media task.

MODE OF DISCLOSURE

Embodiments of the disclosure will now be described more fully with reference to the accompanying drawings.

In the following description of embodiments, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments of the disclosure.

FIG. 1 illustrates architecture of a general network based media processing (NBMP) technology.

An NBMP system 100 refers to a system for processing media via one or more processing entities in a network.

The NBMP system 100 may include a media source 110, an NBMP source 160, an NBMP workflow manager 150, a function repository 140, a media processing entity 120, a media sink 130, and a 3rd party entity 170.

The NBMP system 100 may specify an interface for generating and controlling a workflow for processing media on the network. An NBMP workflow may provide a chain of one or more tasks for processing particular media, and chains of tasks may be sequential or parallel or two chains may be combined.

The NBMP source 160 may be an entity for describing a media processing procedure in the network. The NBMP workflow refers to a graph of one or more connected tasks for performing requested processing of media.

The media source 110 may be an entity that provides raw media content to be processed by the media processing entity 120. The media source 110 may include, for example, a digital camera, a microphone, a server, an encoder, or a permanent repository.

The NBMP workflow manager 150 may be an entity for providing tasks, and connecting the tasks to generate a complete NBMP workflow based on a workflow description.

The function repository 140 may be a repository from which NBMP functions are obtained by the NBMP workflow manager 150 or the NBMP source 160. The media processing entity 120 may be an entity for executing one or more media processing tasks.

The media sink 130 may be an entity capable of using an output of the NBMP workflow by using legacy transmission methods. The legacy transmission methods may include download, dynamic adaptive streaming over HTTP (DASH), MPEG media transport (MMT), or another means.

The media processing entity 120 may include processing tasks 121 and 122 to be applied to media data and metadata therefor which are received from the media source 110 or other media processing entity. The media processing entity 120 may provide a control function for configuring and managing the processing tasks 121 and 122.

The processing tasks 121 and 122 may each mean a running instance of a processing function executed in the media processing entity 120, and may generate media data and metadata therefor to be used by the media sink 130 or other media processing task.

An NBMP framework shown in FIG. 1 may support all types of media content which include legacy MPEC codecs and MPEG formats including ISO/IEC 13818-1, ISO/IEC 14496-12, ISO/IEC 23008-1, and ISO/IEC 23009-1. The NBMP framework may support a delivery via an internet protocol (IP)-based network using common transport protocols (e.g., a transmission control protocol (TCP), a user datagram protocol (UDP), a real-time transport protocol (RTP), and a hypertext transfer protocol (HTTP).

The NBMP system 100 may describe a workflow by configuring a set of media processing functions which are accessible through an application programming interface (API).

The NBMP system 100 may specify an interface for generating and controlling a media processing workflow of a network.

The NBMP system 100 may be divided into a control plane and a media plane.

The control plane may manage a workflow API, a function discovery API, and a task API. The workflow API may be used by the NBMP source 160 to generate and control a media processing workflow. The function discovery API may provide a means for the NBMP workflow manager 150 and/or the NBMP source 160 to discover a media processing function that may be loaded as a part of a media processing workflow. The task API may be used by the NBMP workflow manager 150 to configure and monitor a task at runtime.

The NBMP system 100 may define a media format, metadata, and a supplementary information format between the NBMP source 160 and the tasks 121 and 122 and between the tasks 121 and 122 on the media plane. An NBMP format refers to a media format exchanged between the media source entities 110, 160, and 170 and the media processing entity 120, and between each of the media source entities 110, 160, and 170 in the NBMP system. An NBMP publish format indicates a media format of content delivered from the media processing entity 120 to the media sink 130.

A control function may provide functions for managing and controlling tasks and a workflow, and a processing function may provide a function for the media processing entity to process media, according to an indication by the control function.

Figure 2:
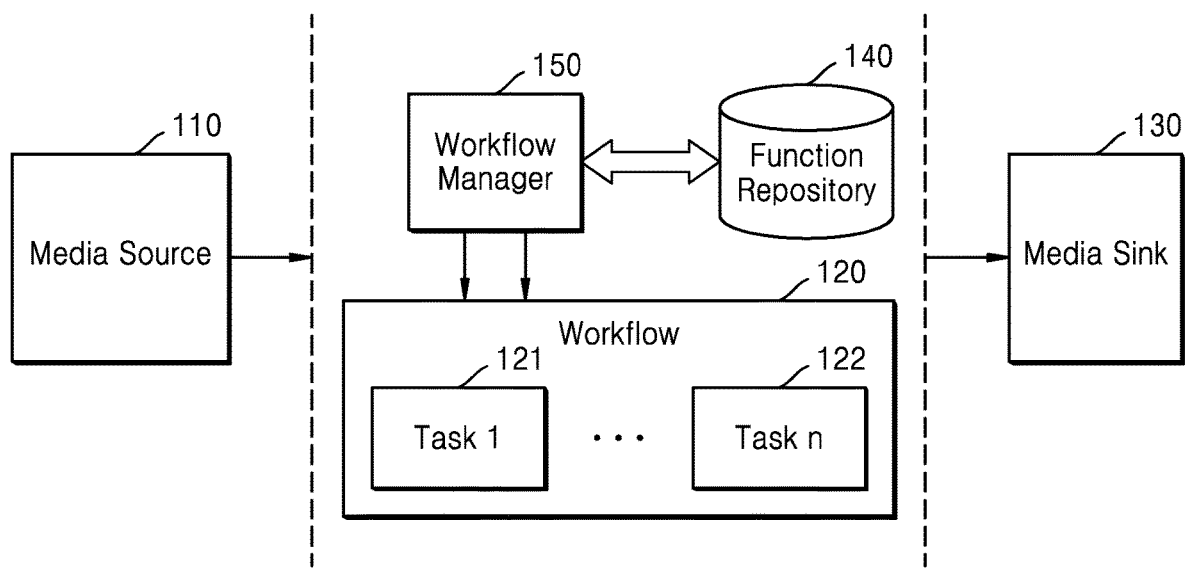
FIG. 2 illustrates interworking between a workflow manager and a function repository in an NBMP system according to an embodiment of the disclosure.

FIG. 2 illustrates interworking between a workflow manager and a function repository in an NBMP system according to an embodiment of the disclosure.

Referring to FIG. 2, an NBMP system 200 may include the media source 110, the workflow manager 150, the function repository 140, a workflow 120, and the media sink 130. Redundant descriptions about a function and operation of each element which are described with reference to FIG. 1 are not provided here.

The workflow manager 150 uses a workflow to distribute media processing and configure media processing entities, based on information received from the media source 110. In a computation-intensive media processing service, the workflow manager may configure a plurality of computation instances, and may distribute a workload to the plurality of instances. In this case, the workflow manager functions to configure all instances as desired. The instances may be configured according to two methods below.

According to the first method, the workflow manager allocates a same task to a plurality of instances, and provides a load balancer to distribute a workload to the instances by using a selected scheduling mechanism.

According to the second method, the workflow manager (parallel) allocates a different operation of the same task to different instances.

In both the two methods, the workflow manager provides a communication path between the instances, thereby allowing the workload to be successfully completed. Also, the workflow manager configures media data/stream, for which tasks are processed, to be pushed to a next task on a workflow. This procedure may be implemented through a pull mechanism.

The workflow manager defines a task list and connects tasks so as to create a workflow. A processing model of the workflow manager may be explained by using operations below.

Firstly, the workflow manager discovers an available media processing task. In detail, in an NBMP task, searchable interfaces are implemented such that external entities can query a media processing task and satisfy requested processing. The workflow manager may access a directory service that provides searchable lists of media processing tasks. Also, the workflow manager may use a task description in a workflow description document so as to search for an appropriate task for a current workflow.

Secondly, the workflow manager selects media processing tasks to prepare a workflow. In detail, when a media processing request is received from the media source, the workflow manager scans the function repository so as to search for a list of all functions that can satisfy the workflow. To finalize the workflow, the workflow manager checks whether all functions of the function repository should be selected, by using a workflow description delivered from the media source. The checking is performed based on media processing information such as input and output descriptions about each task of the function repository, a requested processing description, other descriptor, and the like delivered from the NBMP source.

The core of implementation of NBMP is to map a source request to an appropriate media processing work to be included in the workflow. The workflow manager may discover an appropriate function to be executed as a task by using a function discovery API. Alternatively, the workflow manager may retrieve details of all functions of the function repository by using the function discovery API. The workflow manager may check information about another descriptor of each fetched function delivered from the source.

Thirdly, the workflow manager configures selected media processing tasks. When functions to be included in the workflow are confirmed, the workflow manager executes a task in a next operation and configures the task to be included in the workflow. The workflow manager may extract configuration data and configure the selected tasks by using a plurality of pieces of received information for media processing. The configuration of the tasks is performed by using a task API.

According to an embodiment, instead of the function repository 140, a media processing task directory (not shown) may be included, and in this regard, the media processing task directory may perform an operation equal or similar to that of the function repository 140.

TABLE 1

Workflow Descriptor

Detail
Input
Output
Processing
Requirement
Configuration
Delay
Client Assistance
Failover
Monitoring
Assertion
Reporting
Notification Table 1 shows an embodiment of a workflow descriptor.

The workflow description as shown above may be delivered from the NBMP source to the workflow manager, and may describe details such as input/output data, required functions, requirements, and the like for a workflow. The workflow description may be encoded by using JavaScript object notation (JSON) or extensible markup language (XML).

A function set provided by the function repository may be read by the NBMP source, such that a workflow description document may be configured by using two methods below according to use cases and actual requirements.

Firstly, the NBMP source requests generation of a workflow by using a function set of the function repository and selects a function to be included in the workflow. In this case, the NBMP source may request generation of the workflow by specifying a function name set read from the function repository and connection of a task.

In this regard, the connection of the task may be specified by using a port identifiers as an input and output key of each task, the port identifier being defined in InputPorts and OutputPorts parameters as the keys in an input and output of each task. Mapping information (taskConnectionMap) of a processing descriptor is used to map an input port of a certain task to an output port of other task. In this case, a keyword and a uniform resource locator (URL) of the processing descriptor may be empty or may not be specified.

When the workflow manager receives a plurality of pieces of such information from the NBMP source, the workflow manager generates a workflow according to definition in input and output port arrays, based on the function name and the task connection.

Secondly, the NBMP source requests generation of a workflow by using a keyword set used by the workflow manager to configure a workflow. The NBMP source may not recognize full information about a function set to be inserted into the workflow. In this case, the NBMP source may request generation of the workflow by specifying a keyword set and all descriptors in a workflow description document in Table 1, which are required by the workflow manager to search for an appropriate function.

TABLE 2

| API Resource | Resource Properties |
| --- | --- |
| Workflow-description | InputDescriptor, OutputDescriptor, ProcessingDescriptor, RequirementDescriptor, ConfigurationDescriptor, DelayDescriptor, ClientAssistanceDescriptor, FailoverDescriptor, MonitoringDescriptor, AssertionDescriptor, ReportingDescriptor |

Table 2 shows an embodiment of a resource of a workflow API.

The NBMP source communicates with the workflow manager by using an NBMP workflow API. The workflow API resource indicates a resource to be used by a workflow API, and the workflow API indicates an operations that act on the resource.

A resource called "workflow description" may be modeled by configuring a specified descriptor in all workflow descriptions by using a descriptor set included in a description document. This means that, when the NBMP source sends a workflow description resource, a server (the workflow manager) can extract details of all descriptors.

TABLE 3

| API | From | To | Description | Request Parameters | Response Parameters |
| --- | --- | --- | --- | --- | --- |
| CreateWorkflow | Media Source | Workflow Manager | Create a workflow | Workflow-description resource representation with all workflow specific descriptors | Acknowledgement of workflow creation Workflow Resource Id Endpoint information where to send media data, metadata, and other information for processing |
| UpdateWorkflow | Media Source | Workflow Manager | Update a previously created workflow | Updated workflow-description resource consisting of one or more workflow specific descriptors. The propertiers of individual descriptors themselves can be partially sent | Acknowledgement of workflow update Workflow Resource Id Updated endpoint information where to send media data, metadata, and other information for processing |

TABLE 3-continued

| API | From | To | Description | Request Parameters | Response Parameters |
|---|---|---|---|---|---|
| DeleteWorkflow | Media Source | Workflow Manager | Terminate a previously created workflow | Workflow Resource Id | Acknowledgement of workflow termination Workflow Resource Id |
| Retrieve Workflow | Media Source | Workflow Manager | Retrieve a previously configured workflow | Workflow Resource Id | Acknowledgement of workflow retrieval Complete workflow-description resource representation |
| GetReports | Media Source | Workflow Manager | Get reports for a previously configured workflow | Workflow Resource Id Report Type (e.g., QoE, consumption, fedback, analysis) | Workflow Resource Id Detailed report for the requested report type |

Table 3 shows an embodiment of an operation of the workflow API.

The workflow API operation may be supported by using a workflow description resource.

TABLE 4

| Parameter | | | Applicability To | | |
|---|---|---|---|---|---|
| Name | Description | Type | Function | Task | Workflow |
| Device Capabilities | Provides information from client about device capabilities | String | Specifies device capabilities the function can take into consideration | Specifies device capabilities the task can take into consideration | Specifies device capabilities the workflow can take into consideration |
| User Preferences | Provides information from client about user preferences | String | Specifies user preferences the function can take into consideration | Specifies user preferences the task can take into consideration | Specifies user preferences the workflow can take into consideration |

Table 4 shows an embodiment of a client assistance descriptor.

The client assistance descriptor from among the workflow descriptors provides client assistance information with respect to a default resource. The client assistance descriptor may include a parameter for device capabilities and a parameter for user preferences.

The parameter for device capabilities may provide information about the device capabilities received from a client, and may specify a function, a task, or the device capabilities that may be considered in the workflow.

The parameter for user preferences may provide information about the user preferences received from the client, and may specify a function, a task, or the user preferences that may be considered in the workflow.

Figure 3:
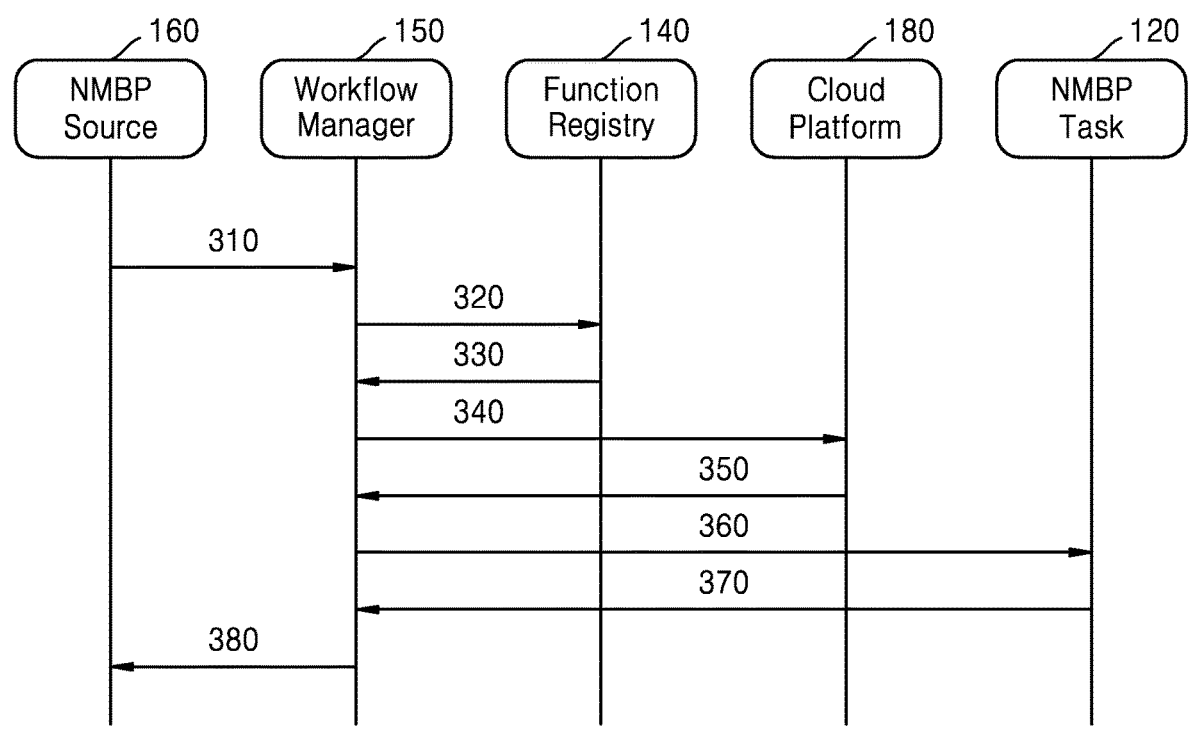
FIG. 3 illustrates a flowchart of operations of generating a workflow in an NBMP system according to an embodiment of the disclosure.

FIG. 3 illustrates a flowchart of operations of generating a workflow in an NBMP system according to an embodiment of the disclosure.

Referring to FIG. 3, the NBMP system may include the NBMP source 160, the workflow manager 150, the function repository 140, a cloud platform 180, and the NBMP task 120. The NBMP task 120 may collectively refer to a plurality of NBMP tasks for performing respective functions.

In operation 310, the NBMP source 160 generates a workflow by using a workflow API, and delivers a workflow description document along with a workflow generation request to the workflow manager 150. When the workflow manager receives the workflow generation request, the workflow manager checks the workflow description document, and starts generation of a workflow.

In operation 320, the workflow manager 150 transmits, to the function repository 140, a query for searching for a function to be distributed in the workflow.

In operation 330, in response to the query, the function repository 140 transmits available functions and a description and configuration information about the functions to the workflow manager 150.

In operation 340, when the workflow manager 150 receives the response from the function repository 140, the workflow manager 150 selects a set of functions to be distributed in the workflow, and according to requirements, accesses the cloud platform 180 so as to generate necessary media processing entities and load a corresponding function.

In operation 350, the cloud platform 180 confirms generation of each media processing entity including network access information, and delivers the related information to the workflow manager.

In operation 360, the workflow manager 150 generates configuration of each task, and transmits the configuration to the task 120 by using a task API.

In operation 370, the NBMP task 120 confirms that the configuration has been succeeded, and returns the access information so as to allow the workflow manager to connect to a next task.

In operation 380, the workflow manager 150 confirms generation of the workflow to the NBMP source 160, and informs a start of media processing.

Figure 4:
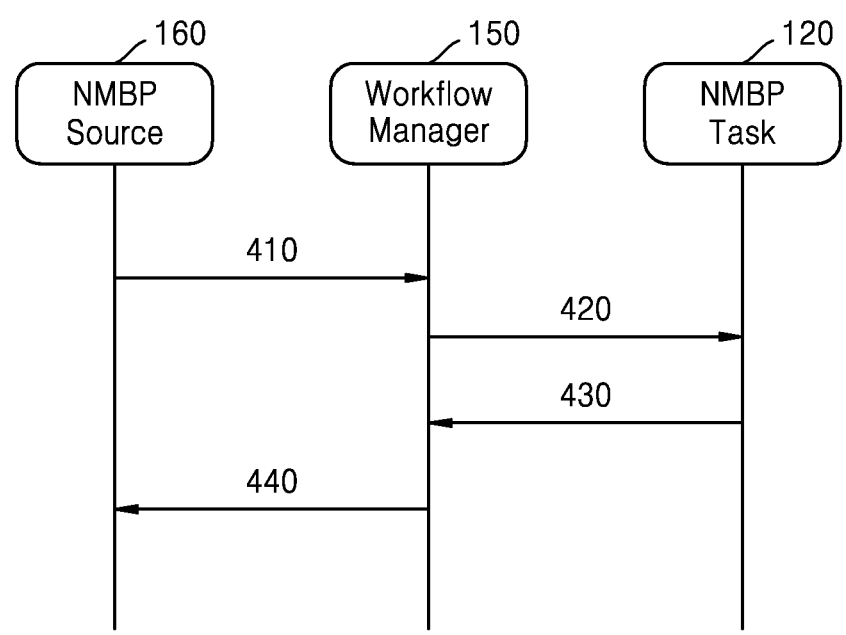
FIG. 4 illustrates a flowchart of operations of updating a workflow in an NBMP system according to an embodiment of the disclosure.

FIG. 4 illustrates a flowchart of operations of updating a workflow in an NBMP system according to an embodiment of the disclosure.

In order to hide details in the workflow from the NBMP source 160, all updates on the workflow have to be performed by the workflow manager. In particular, the NBMP source may not be able to know entry points to the different task control functions.

A workflow update procedure may be performed by a workflow API, and may be implemented by the workflow manager using a task API.

In operation 410, when the NBMP source 160 recognizes that there is a need to update the workflow, the NBMP source 160 updates a configuration parameter by using a parameter description received from the workflow manager 150, and delivers an updated workflow descriptor to the workflow manager.

In operation 420, the workflow manager 160 extracts, from the workflow descriptor, configuration parameter updates for respective NBMP tasks, and delivers update information to the corresponding task 120 by using the task API.

In operation 430, when a parameter update is approved, the NBMP task 120 confirms a success of the parameter update to the workflow manager 150. When the parameter update is not approved, the NBMP task 120 responds with an error message without changing a current work nor interrupting media processing.

In operation 440, after an update on all tasks is completed, the workflow manager 150 informs the NBMP source 160 about completion of the update on the workflow.

In another case, the update may cause an interruption to the media processing, thereby affecting an NBMP sink. The NBMP source has to detect the interruption through a configuration description. Each parameter may indicate whether an interruption to media processing is to occur, when each parameter is changed.

Figure 5:
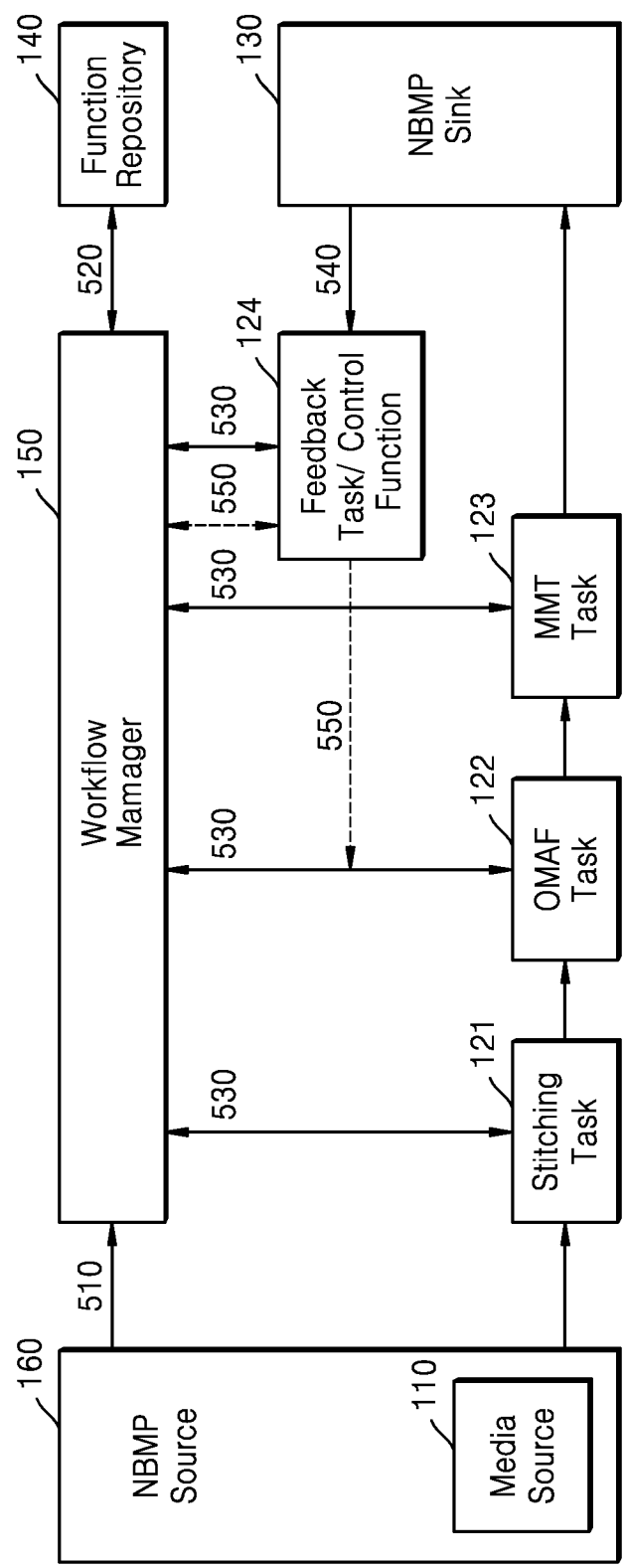
FIG. 5 illustrates operations of respective entities in a block diagram of an NBMP system using a feedback task according to an embodiment of the disclosure.

FIG. 5 illustrates operations of respective entities in a block diagram of an NBMP system using a feedback task according to an embodiment of the disclosure.

Referring to FIG. 5, the NBMP system may include the media source 110, the NBMP source 160, the NBMP sink 130, the function repository 140, the workflow manager 150, and tasks 121, 122, 123, and 124. The tasks include the stitching task 121, the omni-directional media format (OMAF) task 122, the MMT task 123, and the feedback task 124, and the feedback task may deliver, to each task, user feedback information obtained from the NBMP sink.

FIG. 5 provides the stitching task, the OMAF task, and the MMT task as an embodiment of a media processing workflow, but a media processing task is not limited to the tasks. The media source 110 may refer to a media provision server or a server capable of providing media. Also, the NBMP sink 130 may refer to an entity including a media sink, a user, a user terminal, or a client which can use an output of a workflow.

In operation 510, to start or set up a service, the NBMP source 160 delivers a workflow description to the workflow manager 150 via a workflow API. In this regard, the workflow description may include a processing descriptor and other data parameters, and may include information indicating whether the corresponding service can use user feedback information. According to an embodiment, whether the corresponding service can use the user feedback information may be in the form of a flag.

In operation 520, the workflow manager 150 may search for, in the function repository 140, a function of tasks for configuring a workflow via a function discovery API, based on the obtained workflow description, and may obtain a function description. According to an embodiment, the NBMP source 160 may search for, in the function repository 140, a function of tasks via the function discovery API. In this case, the workflow manager 150 may receive a function description from the NBMP source. According to an embodiment, a function descriptor may include information about a task type. The task type may be identified as a media processing task or a control/feedback task.

In operation 530, the workflow manager 150 may generate a task description based on three entities including a workflow description, a function description, or an infrastructure manager, and may deliver the generated task description to each of the tasks 121, 122, 123, and 124 via the task AP The NBMP sink 130 may be provided a media service for which a media of the media source 110 is sequentially processed in the stitching task 121, the OMAF task 122, and the MMT task 123 according to the workflow. When the service uses user feedback information, the workflow manager may separately generate the feedback task 124 (also referred to as a control function).

In operation 540, the NBMP sink 130 may recognize a feedback task (server), and may deliver a feedback message including feedback information to the feedback task 124 via an MMT or an application.

In operation 550, the feedback task 124 may deliver the feedback information obtained from the NBMP sink 130 to the task 122 to use the feedback information, and may request the workflow manager 150 for an update.

The task description may include descriptors as below.

A detail descriptor includes information about a task type. The task type may be identified as a media processing task or a control/feedback task.

A task input descriptor may include feedback parameters below, in addition to other data parameters. A feedback parameter may include a stream schema and a feedback stream description including stream information. The stream information may include at least one of identification information about a feedback stream that is an identifier capable of identifying a content component, tag information about a stream, bandwidth information about the feedback stream, information about a feedback type, information about a protocol for accessing or delivering feedback information, or origination information about a location from which feedback information is sent or a location from which a media is fetched. According to an embodiment, the feedback type may include at least one of whether a feedback is about a viewport, whether a feedback is about a view point, whether a feedback is about capabilities, or whether a feedback is about the number of objects.

A task output descriptor may include feedback parameters below, in addition to other data parameters. A feedback parameter may include a stream schema and a feedback stream description including stream information. In addition to the feedback parameters included in the task input descriptor, the stream information may further include information about a destination to which an output of each task is to be delivered.

A reporting descriptor may include at least one of information about a feedback reporting type or information about a configuration update delivered from a task to the workflow manager.

The information about the configuration update may include at least one of information about a configuration update request or information about configuration update reporting, and the configuration update request may indicate a procedure in which a task delivers a received feedback parameter to the workflow manager, and requests to update configuration descriptor information in a task description.

Figure 6:
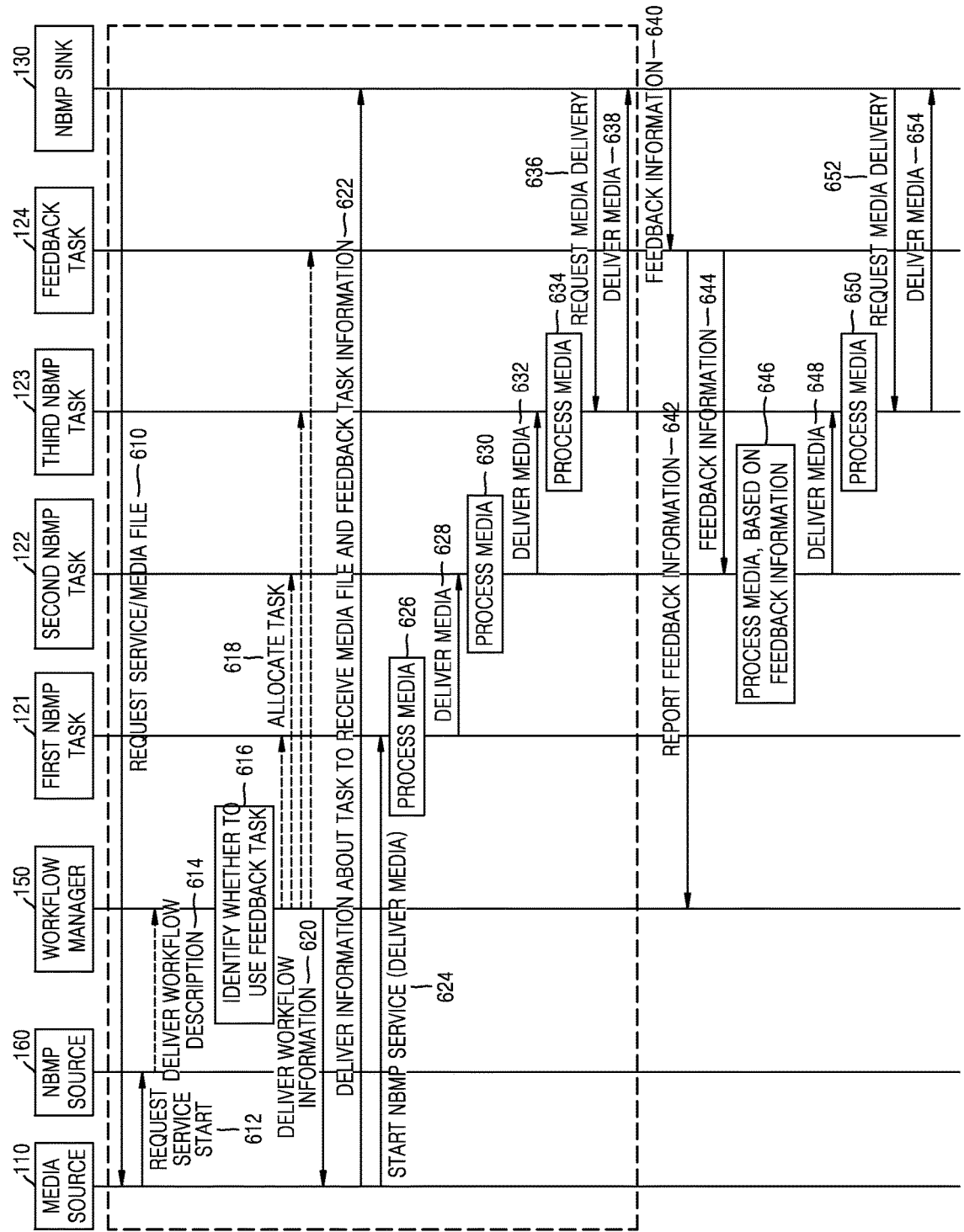
FIG. 6 is a flowchart of operations of a method of using a feedback task in an NBMP system according to an embodiment of the disclosure.

FIG. 6 is a flowchart of operations of a method of using a feedback task in an NBMP system according to an embodiment of the disclosure.

Referring to FIG. 6, the NBMP system may include the media source 110, the NBMP source 160, the NBMP sink 130, the function repository 140, the workflow manager 150, and the tasks 121, 122, 123, and 124. The media source 110 may refer to a media provision server or a server capable of providing media. Also, the NBMP sink 130 may refer to an entity including a media sink, a user, a user terminal, or a client which can use an output of a workflow.

In operation 610, when the NBMP sink 130 requests the media source 110 to provide a service or a media file, in operation 412, the media source 110 requests the NBMP source 160 to start the service.

In operation 614, the NBMP source 160 delivers a workflow description to the workflow manager 150 to generate a workflow.

In operation 616 and operation 618, the workflow manager 150 identifies whether to use a feedback task, based on the workflow description, and allocates a function to each task.

In more detail, the workflow manager 150 checks whether a corresponding service is to use a feedback service, based on information about whether to use feedback information which is included in the workflow description, and when it is confirmed that the feedback service is to be used, the workflow manager 150 allocates a function to the feedback task. The workflow manager 150 connects the feedback task to a media processing task to use the feedback task, based on a task description, and defines an input/output of the feedback task and a feedback type. The feedback task may deliver feedback information obtained according to the feedback type to at least one of the media processing task and the workflow manager, or may deliver necessary information to a specific media processing task.

In an embodiment illustrated in FIG. 6, media content is processed sequentially in the first NBMP task 121, the second NBMP task 122, and the third NBMP task 123, and as a result of checking whether the feedback task is to be used, it is determined that the second NBMP task 122 is to use the feedback task. Therefore, the workflow manager allocates a function to the first NBMP task 121, the second NBMP task 122, the third NBMP task 123, and the feedback task 124. When the function is allocated, the first NBMP task and the second NBMP task, and the second NBMP task and the third NBMP task are connected to each other, according to a service workflow, and the second NBMP task 122 to use the feedback task is additionally connected to the feedback task 124.

In operation 620, the workflow manager 150 may deliver workflow information to the media source.

In operation 622, the media source 110 delivers, to the NBMP sink 130, information about a task (the third NBMP task) from which the NBMP sink 130 is to receive a media file and a task (the feedback task) to which the NBMP sink 130 is to deliver a feedback.

In operation 624, the media source 110 starts an NBMP service for providing the media content to the NBMP sink 130. In the embodiment illustrated in FIG. 4, the media content is to be first processed in the first NBMP task 121, and thus, the media source 110 delivers the media file to the first NBMP task 121.

In operations 626 to 632, each task may process media or may deliver processed media to a next task. Each task performs a defined operation based on information about input/output ports and feedback port information of each task which are included in the task descriptor.

In operation 634, the third NBMP task 123 processes and stores media delivered from the second NBMP task 122.

In operation 636 and operation 638, when a media delivery request is received from the NBMP sink 130, the third NBMP task 123 may deliver the processed media, in response to the request.

Afterward, in operations 640 to 644, when feedback information is delivered from the NBMP sink 130, the feedback task 124 reports the feedback information to the workflow manager 150, and delivers the feedback information to the second NBMP task 122. The feedback information delivered to the second NBMP task 122 conforms to a second NBMP task format.

In this regard, the order of operation 642 and operation 644 may be switched, and operation 642 may be skipped when an update is not required according to a result of determining whether to update the feedback information.

In operation 646, the second NBMP task 122 may process media, based on the feedback information delivered from the feedback task.

A process of operations 648 to 654 is similar to a process of operations 632 to 638, and thus, detailed descriptions thereof are not provided here.

Figure 7:
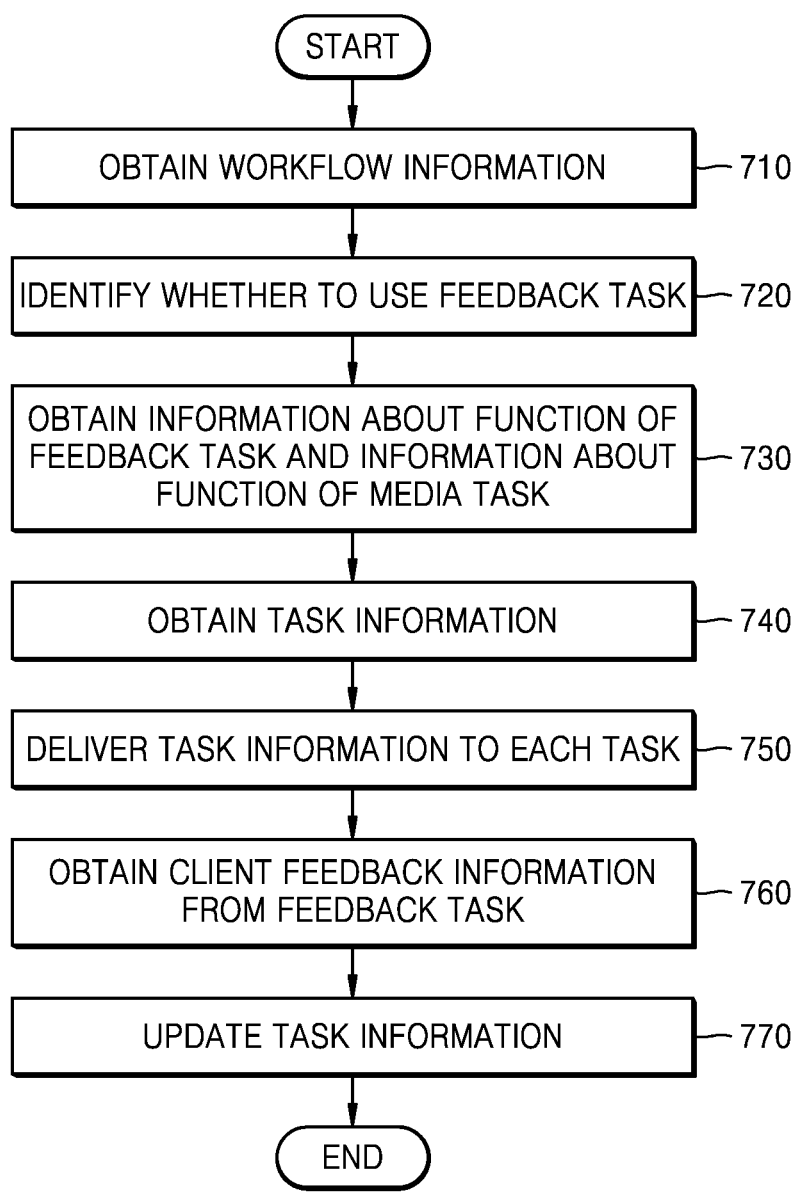
FIG. 7 is a flowchart of a method by which a workflow manager manages a workflow for media processing in an NBMP system using a feedback task according to an embodiment of the disclosure.

FIG. 7 is a flowchart of a method by which a workflow manager manages a workflow for media processing in an NBMP system using a feedback task according to an embodiment of the disclosure.

In operation 710, the workflow manager may obtain, from an NBMP source, workflow information for processing media content. According to an embodiment, the workflow information may be a workflow description.

In operation 720, the workflow manager may identify whether to use a feedback task, based on the obtained workflow information. According to an embodiment, whether to use the feedback task may be included in a client assistance descriptor in the workflow description, and may be implemented as a 1-bit flag indicating whether to use.

In operation 730, the workflow manager may obtain, from a function repository, information about a function of the feedback task and information about a function of a media processing task. According to an embodiment, the information about the function may be a function description.

In operation 740, the workflow manager may obtain task information based on the workflow information and the information about the function. According to an embodiment, the task information may be a task description.

In operation 750, the workflow manager may deliver the task information to the media processing task and the feedback task based on the workflow information and the task information, such that tasks may be connected to create a workflow.

In operation 760, when the feedback task obtains client feedback information from a client, the workflow manager may obtain client feedback information from the feedback task. According to an embodiment, a task using the feedback task from among the media processing task may obtain the client feedback information from the feedback task.

In operation 770, the workflow manager may update the task information by applying the client feedback information obtained from the feedback task.

Figure 8:
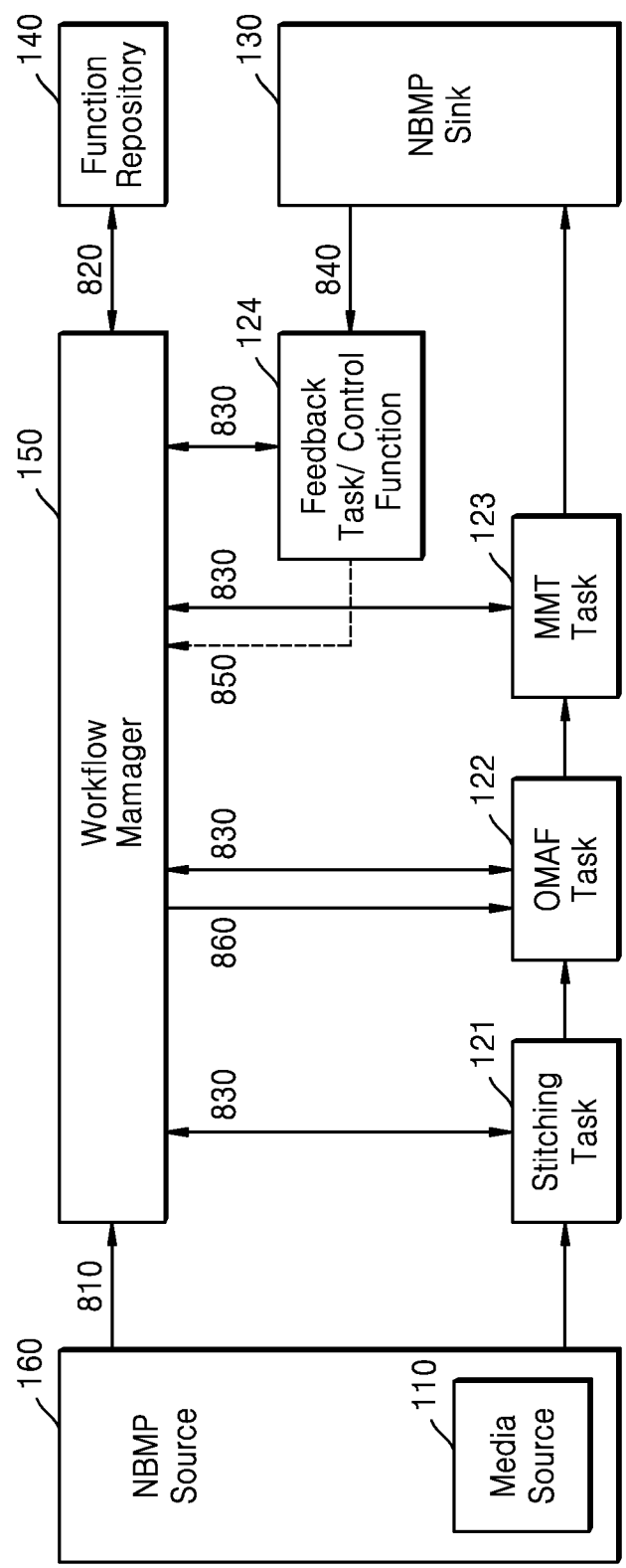
FIG. 8 illustrates operations of respective entities in a block diagram of an NBMP system using a feedback task according to an embodiment of the disclosure.

FIG. 8 illustrates operations of respective entities in a block diagram of an NBMP system using a feedback task according to an embodiment of the disclosure.

Referring to FIG. 8, the NBMP system may include the media source 110, the NBMP source 160, the NBMP sink 130, the function repository 140, the workflow manager 150, and the tasks 121, 122, 123, and 124. The tasks include the stitching task 121, the OMAF task 122, the MMT task 123, and the feedback task 124, and the feedback task may deliver, to the workflow manager, user feedback information obtained from the NBMP sink.

Operations 810 to 840 are similar to operations 510 to 540 shown in FIG. 5, and thus, detailed descriptions thereof are not provided here.

In operation 850, the feedback task 124 delivers, to the workflow manager 150, feedback information obtained from the NBMP sink 130. The feedback information delivered to the workflow manager 150 may include at least one of a reporting descriptor, a task input descriptor, a task output descriptor, or a detail descriptor.

In operation 860, the workflow manager 150 delivers updated task configuration information to the OMAF task 122 to use the feedback information. In this regard, the updated task configuration information may be a task description, and the task description may include at least one of an updated task input descriptor, an updated task output descriptor, or an updated configuration descriptor.

Figure 9:
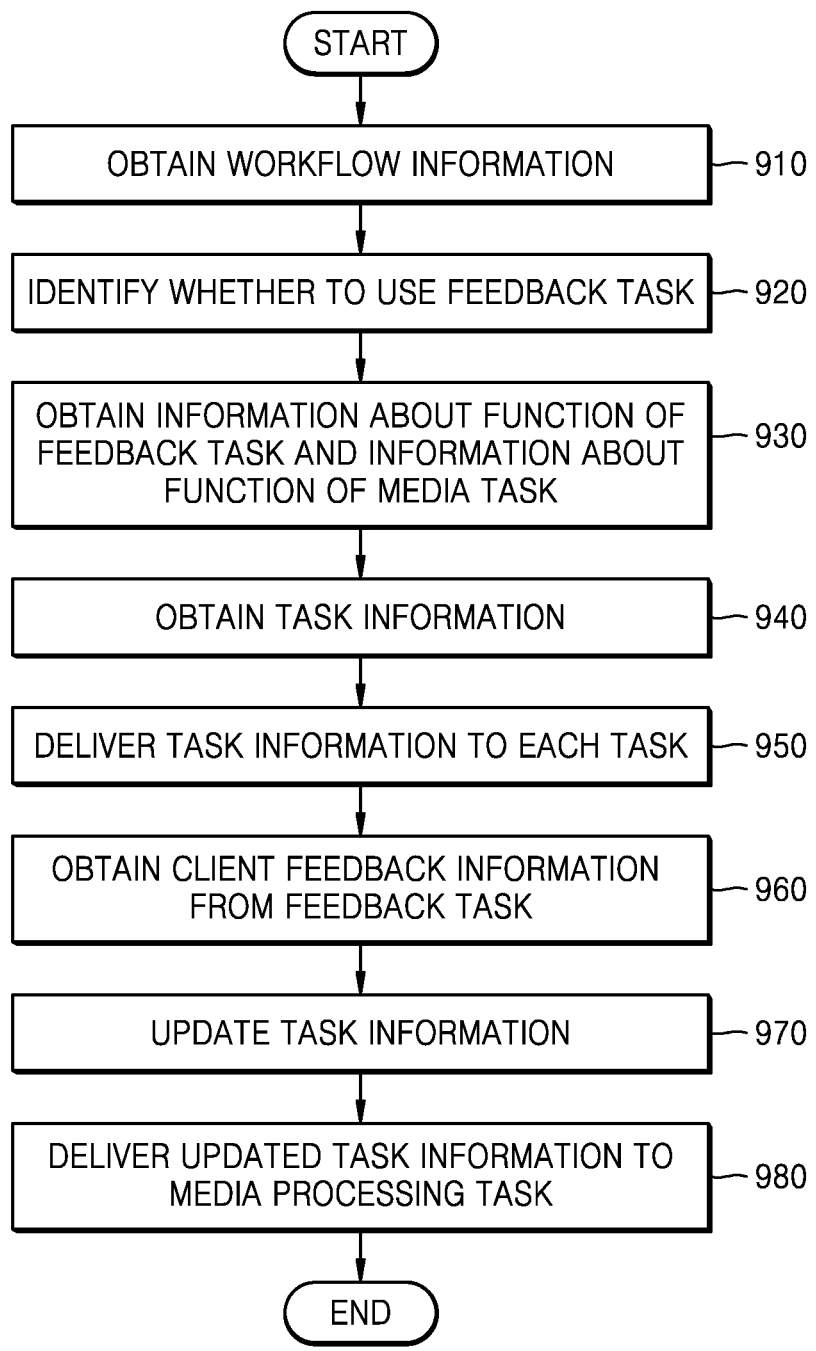
FIG. 9 is a flowchart of a method by which a workflow manager manages a workflow in an NBMP system using a feedback task according to an embodiment of the disclosure.

FIG. 9 is a flowchart of a method by which a workflow manager manages a workflow in an NBMP system using a feedback task according to an embodiment of the disclosure.

Referring to FIG. 9, operations 910 to 950 are similar to operations 710 to 750 shown in FIG. 7, and thus, detailed descriptions thereof are not provided here.

In operation 960, when the feedback task obtains client feedback information from a client, the workflow manager may obtain the client feedback information from the feedback task. Unlike to FIG. 7, in the embodiment of FIG. 9, the feedback task does not deliver the client feedback information to a media processing task.

In operation 970, the workflow manager may update task information by applying the client feedback information obtained from the feedback task.

In operation 980, the workflow manager may deliver the updated task information to the media processing task. According to an embodiment, the media processing task may process media, based on the client feedback information included in the updated task information.

Figure 10:
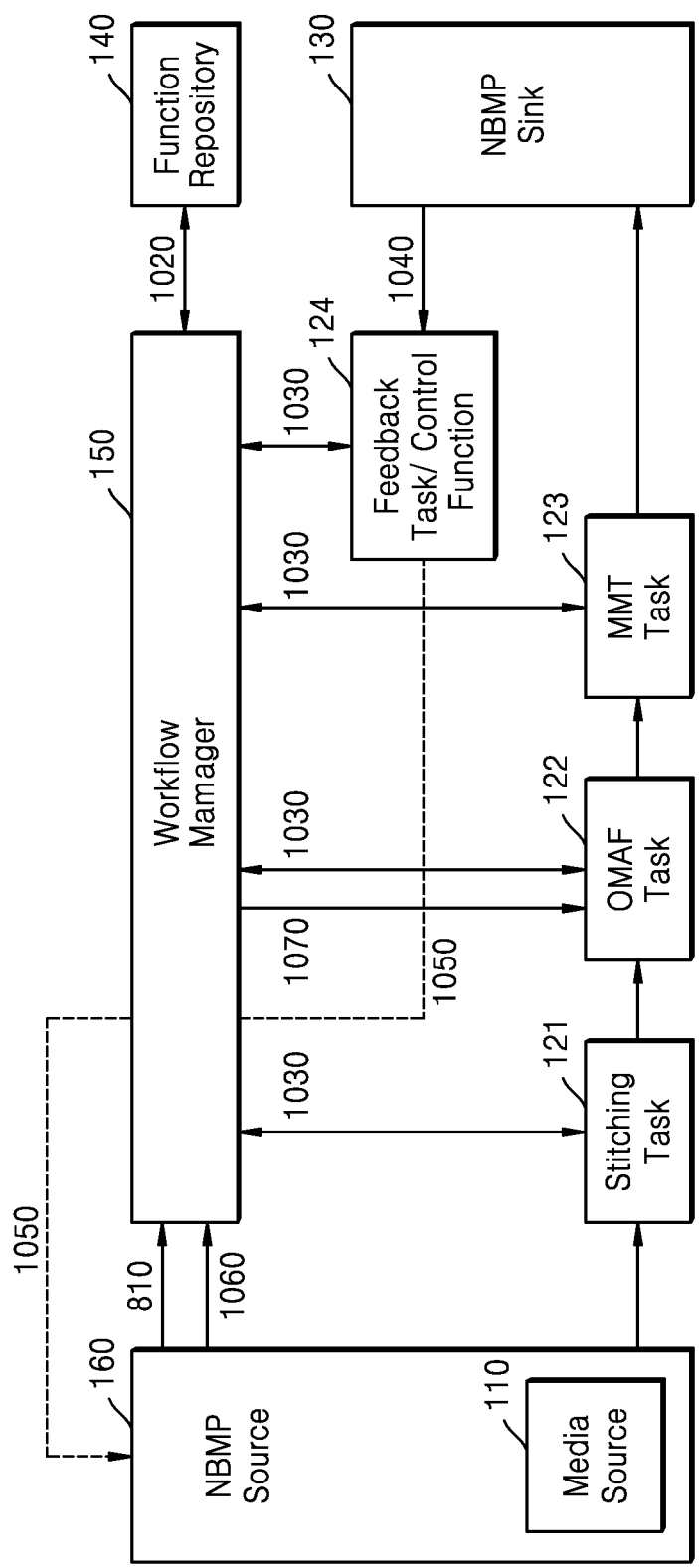
FIG. 10 illustrates operations of respective entities in a block diagram of an NBMP system using a feedback task according to an embodiment of the disclosure.

FIG. 10 illustrates operations of respective entities in a block diagram of an NBMP system using a feedback task according to an embodiment of the disclosure.

Referring to FIG. 10, the NBMP system may include the media source 110, the NBMP source 160, the NBMP sink 130, the function repository 140, the workflow manager 150, and the tasks 121, 122, 123, and 124. The tasks include the stitching task 121, the OMAF task 122, the MMT task 123, and the feedback task 124, and the feedback task may deliver user feedback information obtained from the NBMP sink to the NBMP source via the workflow manager.

Operations 1010 to 1040 are similar to operations 510 to 540 shown in FIG. 5, and thus, detailed descriptions thereof are not provided here.

In operation 1050, the feedback task 124 delivers feedback information obtained from the NBMP sink 130 to the NBMP source 160 via the workflow manager 150. The feedback information delivered to the NBMP source 160 may include at least one of a reporting descriptor, a task input descriptor, a task output descriptor, or a detail descriptor.

In operation 1060, the NBMP source 160 delivers, to the workflow manager 150, a workflow description updated based on the feedback information. The workflow description delivered to the workflow manager may include a configuration descriptor.

In operation 1070, the workflow manager 150 delivers updated task configuration information to the OMAF task 122 to use the feedback information. In this regard, the updated task configuration information may be a task description, and the task description may include at least one of an updated task input descriptor, an updated task output descriptor, or an updated configuration descriptor.

Figure 11:
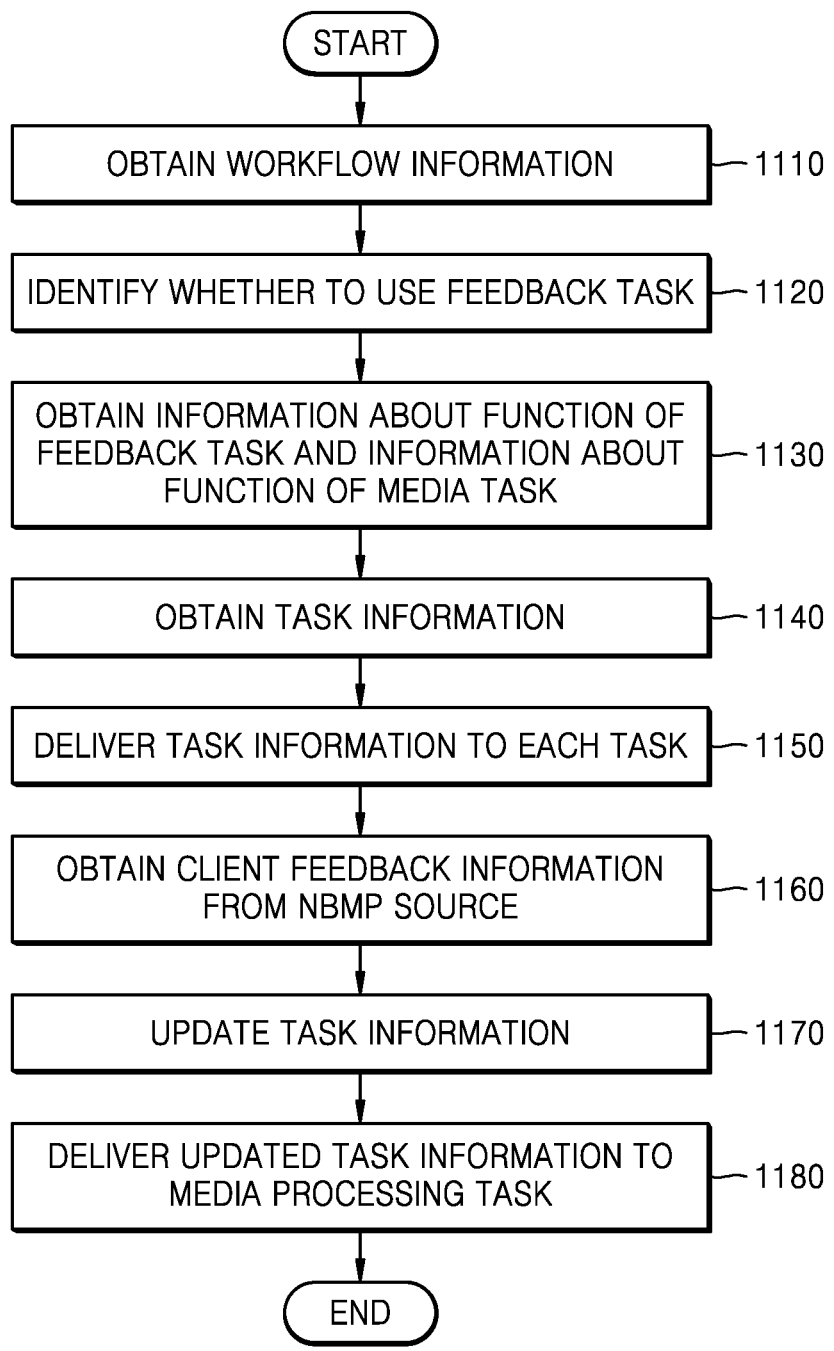
FIG. 11 is a flowchart of a method by which a workflow manager manages a workflow in an NBMP system using a feedback task according to an embodiment of the disclosure.

FIG. 11 is a flowchart of a method by which a workflow manager manages a workflow in an NBMP system using a feedback task according to an embodiment of the disclosure.

Referring to FIG. 11, operations 1110 to 1150 are similar to operations 710 to 750 shown in FIG. 7, and thus, detailed descriptions thereof are not provided here.

Unlike to FIGS. 7 and 9, in the embodiment of FIG. 11, when the feedback task obtains client feedback information from a client, the feedback task delivers the client feedback information to the NBMP source. The NBMP source having obtained the client feedback information updates workflow information, and delivers the updated workflow information to the workflow manager.

In operation 1160, the workflow manager may obtain the client feedback information from the updated workflow information.

In operation 1170, the workflow manager may update task information by applying the client feedback information obtained from the NBMP source.

In operation 1180, the workflow manager may deliver the updated task information to the media processing task. According to an embodiment, the media processing task may process media, based on the client feedback information included in the updated task information.

Figure 12:
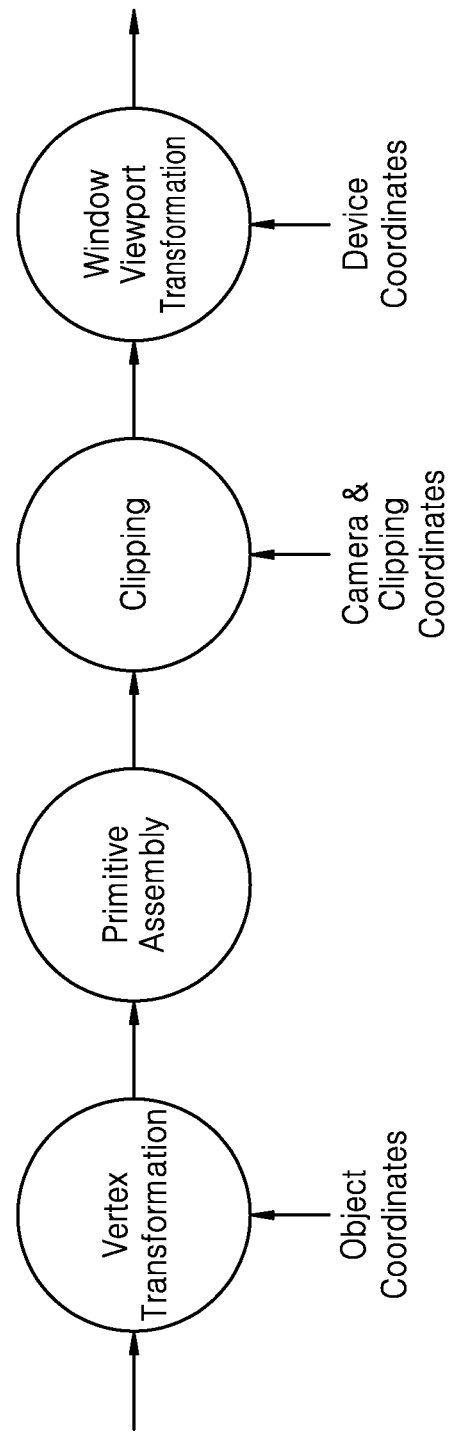
FIG. 12 illustrates a workflow of geometric processing for 6DoF rendering processing.
Figure 13:
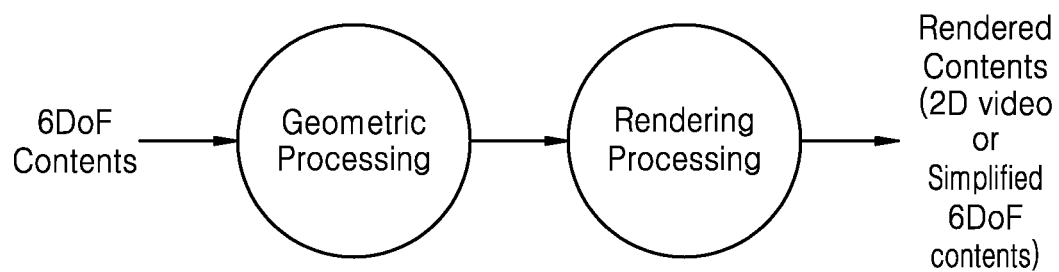
FIG. 13 illustrates a workflow for pre-rendering and remote rendering of 6DoF content.

FIGS. 12 and 13 illustrate a free-rendering workflow of 6DoF content in an NBMP system using a feedback task according to an embodiment of the disclosure.

The 6DoF content indicates content having six degrees of freedom in a three-dimensional perpendicular coordinate system, which include a left and right (roll) rotation with respect to an X-axis, a forward and backward (pitch) rotation with respect to a Y-axis, an up and down (yaw) rotation with respect to a Z-axis, a forward/back (surge) motion, a left/right (sway) motion, an up/down (heave) motion, and a translational motion.

The 6DoF content may include media data such as a geometry, a texture, a material, and the like for representing an object in a three-dimensional (3D) domain, and metadata such as a scene description for describing a related 3D space.

This technology requires transmission of 3D-space information and color information, compared to transmission of an image in a two-dimensional form, and thus, requires not only a huge amount of image transmission but also requires a large amount of computation for a terminal to reproduce corresponding content. By using pre-rendering via NBMP, a data volume of the entire 6DoF content may be decreased and, simultaneously, a part requiring large computation may be performed by a server at a network end, in consideration of a situation of the terminal, such that a load of the terminal may be decreased.

FIG. 12 illustrates a workflow of geometric processing for 6DoF rendering processing.

The geometric processing may include vertex transformation, primitive assembly, clipping, and window viewport transformation.

TABLE 5

| Task | Description | Input | Output |
|---|---|---|---|
| Vertex Transformation | Involves mapping of object in the 3D space based on Point data in 6DoF media data and its related 6DoF meta data (Object Coordinates etc.). | Media data feed from media source (6DoF contents server or camera) | Object in 3D space |
| Primitive Assembly | Involves reconstruction of point data such as mesh or polygon type for representing the shape of an object in 3D space. | point data in 3D space. | Geometric reconstruction data in 3D space |
| Clipping | Involves method to selectively enable or disable rendering operations within a defined region of interest based on user feedback info, (userviewport, userviewlocation etc.) | Geometric reconstruction (mesh) of object in 3D space | Clipping the object in 3D space based on region of interest |
| Window viewport Transformation | Involves transform the object in region of interest to application or device specific coordinates | Clipping the object in 3D space based on region of interest | object in region of interest referenced by application coordinate |

Table 5 shows an embodiment of descriptions of geometric processing tasks for rendering processing of 6DoF content and inputs/outputs.

Referring to FIG. 5, a clipping task may include a method of selectively enabling or disabling rendering operations within a region of interest (ROI) defined based on user feedback information including a user viewport, a user location, and the like. An NBMP service provider may provide a user with a geometric processing service by using a workflow as shown in FIG. 10A. As described above, a task directory of the service provider may include details of each task, and a workflow manager may select such tasks to prepare a workflow.

FIG. 13 illustrates a workflow for pre-rendering and remote rendering of 6DoF content.

The pre-rendering of the 6DoF content includes geometric processing and rendering processing. The 6DoF content having undergone the geometric processing and the rendering processing becomes a two-dimensional (2D) video or simplified 6DoF content.

When a state of a user terminal or a network bandwidth cannot receive entire 6DoF content, 2D content or simplified 6DoF content may be provided based on user feedback information.

In remote rendering, rendering processing may provide a rasterization process for pixel mapping to 2D display. In pre-rending, rending processing may provide partial 6DoF content according to user feedback information such as user viewport information.

Figure 14:
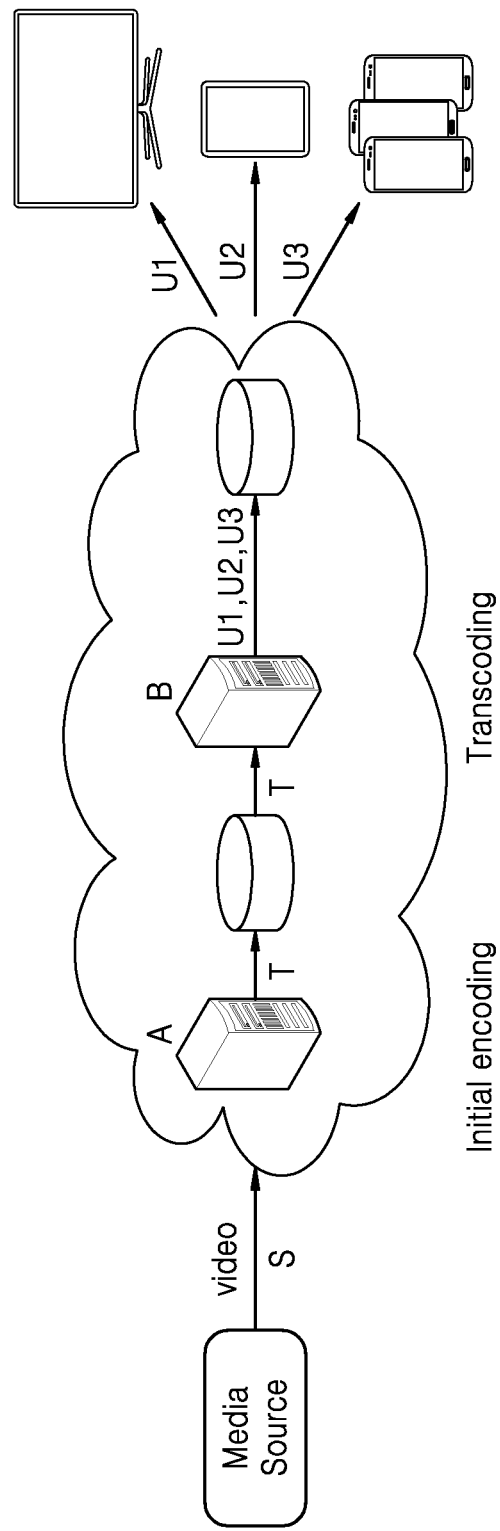
FIG. 14 illustrates a workflow for a content-aware transcoding service in an NBMP system using a feedback task according to an embodiment of the disclosure.

FIG. 14 illustrates a workflow for a content-aware transcoding service in an NBMP system using a feedback task according to an embodiment of the disclosure.

An original video S is encoded with a nominal resolution, a nominal frame rate, and a nominal bitrate by an origin server A so as to generate an initial stream T. The initial stream T is delivered to a node B in a media delivery network. The node B is a server that may exist at any position in the media delivery network, and may even down to an edge node. In the node B, processing may be performed to convert the initial stream T to video expressions U1, U2, and U3 with various resolutions, frame rates, and bitrates, and the video expressions may be delivered to a user terminal.

Content-aware transcoding using an NBMP framework may be applied as two types. The first type is a method of using a preset list of bitrates, and the method may involve configuring a video output of the content-aware transcoding with a requested bitrate, based on timed-metadata providing a video format recommended for each segment with respect to each bitrate of the list.

The second type is a method of using a list of available video formats, and the method may involve configuring a video output of the content-aware transcoding with a requested bitrate, based on timed-metadata providing a minimum bitrate for each segment with respect to each format of the list.

In the transcoding of the first type, an encoder generates a media stream with a nominal resolution and a nominal frame rate for expression with a highest bitrate by using an appropriate compression standard and profile with respect to each segment of a video, and determines a nominal resolution and a nominal frame rate for another expression with a low bitrate.

The encoder sets up a list of bitrates with respect to each segment, and delivers information about a recommended format (a resolution and frame rate) to a packager. The packager generates a video segment for expression with a highest bitrate, and adds it and information related to other available expression to a timed-metadata segment.

The encoder sets up a playlist/manifest file to give the links to the video and metadata segment, and delivers the segment and the playlist/manifest file to an origin server. The origin server transmits them to servers via CDN, thereby transmitting them down to an edge server.

An over the top (OTT) player obtains a list of available bitrates of an OTT service via a request with respect to CDN, and when there is a specific limitation, the OTT player requests expression with a bitrate designated according to a bandwidth condition of a local network, and a maximum resolution and frame rate.

When a maximum bitrate is requested by the OTT player, and a resolution or a frame rate of a video segment is not higher than a resolution or a frame rate which is supported by the player, a server provides a video segment received from the origin server.

When a low bitrate is requested, the server triggers a task for transcoding an existing video segment to a video segment with a low bitrate. The bitrate of the transcoded video segment is determined based on a recommended resolution and frame rate provided by metadata related to the segment or a limitation condition requested by the player.

Equally, in a case where the OTT player requests a highest bitrate but there is a condition with more restrictive constrains on a resolution and frame rate, compared to those used to generate an existing video segment, the server triggers a transcoding task. The transcoding task converts the previous video segment with the same capped bitrate but with a lower bitrate or frame rate.

TABLE 6

| No | Parameter | Additional Description |
|---|---|---|
| 1 | InputDescriptor | Provides information describing input that the media source intends to use for this workflow.<br>Media Parameters:<br>Codec type (AVC/HEVC/VVC)<br>Media Type (Profile + Level)<br>Codec clock rate<br>Transport Protocol for delivery of media<br>Origination: URL of the Media stream<br>Metadata Parameters:<br>Metadata Type:<br>RecommendedVideoFormat (rvrf)<br>Transport Protocol for delivery of<br>meta data<br>Origination: URL of the Metadata stream |
| 2 | ProcessingDescriptor | Provides details about the type of processing the media source intends to set up.<br>Keyword Search for Tasks: AVC/HEVC/VVC video transcoding |
| 3 | RequirementDescriptor | Specifies requirement information for the complete workflow.<br>Such information includes:<br>QoS requirements: Detailed QoS requirements for the end-to-end workflow<br>delay requirements Real-time<br>Processing requirements: No need<br>Security requirements: No need |
| 4 | OutputDescriptor | Provides information describing output that the media source intends for the workflow to output .<br>DistributionFormat to the media sink CMAF<br>Media Parameters: Array of output media descriptions. Each media stream description includes:<br>Codec type: AVC/HEVC/VVC<br>Media Type: Profile + Max Res/Fr requested by the client<br>Codec clock rate OK<br>Transport Protocol: HTTP<br>Destination: URL<br>Metadata Parameters: No Metadata |
| 6 | FailoverDescriptor | Provides information in case of failover of this workflow.<br>FailoverMode:<br>ExecutBackupDeployment<br>FailoverDelay: 0<br>State Persistance Descriptor:<br>BackupDeployment: |
| 7 | MonitoringDescriptor | Provides information for type of monitoring for this workflow.<br>Such information includes:<br>Event: CRITICAL event<br>Variable: No need<br>System: No need |

Table 6 shows an embodiment of a transcoding workflow description for generating a transcoding workflow.

A flowchart of operations of executing the content-aware transcoding task in the NBMP system using a feedback task according to an embodiment of the disclosure follows FIG. 3. However, descriptions of a unique operation related to transcoding are as below.

In operation 310, the NBMP source 160 delivers a workflow description document when requesting the workflow manager 150 for a workflow generation request.

The workflow manager 150 checks the workflow description document, and creates a workflow. An input descriptor may provide an URL of content-dependent metadata for dynamically changing a configuration of a transcoding task. An output descriptor may provide conditions of a maximum bitrate, a maximum resolution, and a maximum frame rate which are indicated by a client. When a condition is changed, a workflow update via UpdateWorkflow API operation is requested, but the change in the condition has to be performed according to recommendations based on the content-dependent metadata.

In operation 320, the workflow manager 150 transmits, to the function repository 140, a query for searching for an AVC/HEVC/VVC transcoding function to be distributed in the workflow.

In operation 330, in response to the query, the function repository 140 transmits available functions and a description and configuration information about the functions to the workflow manager 150.

In operation 340, when the workflow manager 150 receives the response from the function repository, the workflow manager 150 selects a transcoding function, and accesses the cloud platform 180 so as to generate media processing entities and load a function (an image of a transcoder docker).

In operation 350, the cloud platform 180 confirms generation of each media processing entity including network access information, and delivers the related information to the workflow manager.

In operation 360, the workflow manager 150 sets parameters (a bitrate, a resolution, and a frame rate) of output media to be reproduced in the transcoding task by using conditions provided via the content-dependent metadata and an output descriptor of the workflow. The workflow manager transmits configuration information to a task by using a task API.

In operation 370, the task 120 confirms that the configuration has been succeeded, and returns the access information.

In operation 380, the workflow manager 150 confirms generation of the workflow to the NBMP source 160.

Afterward, the workflow manager 150 continuously monitors content-dependent metadata related to each video segment. When there is a need to change, for a next segment, the parameters (the bitrate, the resolution, and the frame rate) of the output media to be reproduced in the transcoding task, the workflow manager delivers an updated configuration to the task by using the task API.

After an elapse of several seconds without transcoding due to absence of a request for a stream with a low bitrate, the NBMP source ends the transcoding task by using DeleteWorkflow API.

TABLE 7

| No | Parameter | Additional Description |
|---|---|---|
| 1 | Details | General Information about the task.<br>Name: AVC/HEVC/VVC video transcoding to Res/FR/Bitrate.<br>ID: Task-1<br>Type: AVC/HEVC/VVC Video Transcoding<br>Priority: High<br>Execution Time: Real-time (takes into account video constraints)<br>Input Port Id Array: Task-1_IN_1<br>Output Port Id Array: Task-1_OUT_1 |
| 2 | InputDescriptor | Provides information describing the type of input for this task.<br>Meda Parameters: Passed from Workflow API<br>Metadata Parameters: No need<br>Other Parameters: No need |
| 3 | Processing | Provides details about the type of computation that this task performs.<br>Location: The one given by the Cloud at step 5<br>Start Time: Immediate |
| 4 | DelayDescriptor | Indicates any delay before task startup 0 |
| 6 | RequirementDescriptor | Specifies information for general requirements that this task has to take into account. This information is prepared based on the information for processing from the media source.<br>QoS requirements:<br>delay requirements Real-time<br>Processing requirements: No need<br>Security requirements: No need |
| 7 | OutputDescriptor | Provides information describing the type of output for this task.<br>Media Parameters: Details about the type of media output from this task Profile + Res/FR + Bitrate<br>Metadata Parameters: No need<br>Other Parameters: No need |
| 8 | ConfigurationDescriptor | Provides configuration information that processingDescriptor needs for executing the assigned processing for this task. Such informaton includes:<br>ParameterConfiguration: Configuration details of variables, constants, and parameters required by the executable/script assigned to this task |
| 10 | FailoverDescriptor | Provides information in case of failover of this task. Such information includes: Passed from workflow API |
| 11 | MonitoringDescriptor | Provides information for type of monitoring for this task. Passed from the workflow API |
| 18 | ClientAssistance Descriptor | Specifies client assistance information that this task can use.<br>Such information includes:<br>Device capability information: Information from the client about device capabilities<br>User Preference information: Information from the client about user's preferences<br>FoV Information: Information about viewing port of the user at the client<br>Workflow manager configures a media processing entity |

TABLE 7-continued

| No | Parameter | Additional Description |
|---|---|---|
| | | in the workflow to receive such information from the client. Client information, like max bitrate or max resolution/FR, has been received by the Media source and sent to the workflow manager in the output configuration descriptor. They have been taken into account, as well as the Content-dependent Metadata, to configure the output of the transcoding task |

Table 7 shows an embodiment of a transcoding task description.

Referring to FIG. 7, the transcoding task description may include a client assistance descriptor. The client assistance descriptor being usable by a transcoding task may include at least one of information about terminal capabilities, information about user preferences, or information about field of view (FoV).

The workflow manager may configure media processing entities of the workflow to receive such information from a client.

Client information such as a maximum bitrate, a maximum resolution, a maximum frame rate, and the like is received by the media source and then is transmitted to the workflow manager. An output of the transcoding task is configured based on content-dependent metadata and the information.

Figure 15:
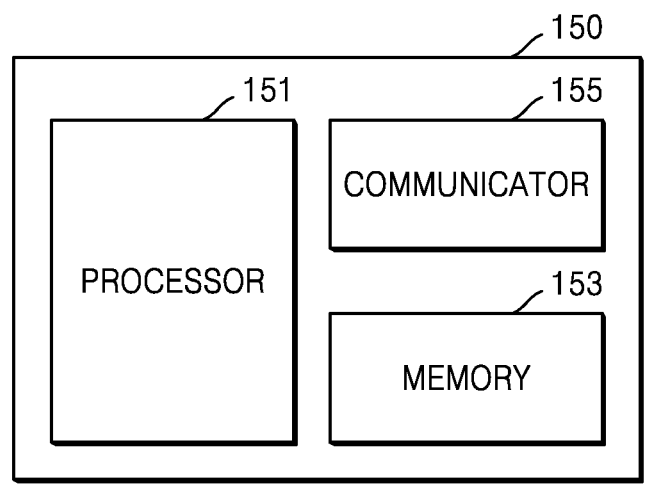
FIG. 15 is a block diagram of a hardware configuration of a workflow manager according to an embodiment of the disclosure.

FIG. 15 is a block diagram of a hardware configuration of a workflow manager according to an embodiment of the disclosure.

Referring to FIG. 15, a workflow manager 1500 may include a processor 1510, a communicator 1520, and a memory 1530.

The workflow manager 1500 may be implemented as a preset server, and FIG. 15 illustrates only elements related to an embodiment. Therefore, one of ordinary skill in the art may understand that there may be other general-use elements in addition to the elements shown in FIG. 15.

The processor 1510 may control a series of processes for generating and managing a workflow, which are described above with reference to FIGS. 1 to 14.

Also, the processor 1510 may function to control general functions for controlling the workflow manager 1500. For example, the processor 1510 may generally control the workflow manager 1500 by executing programs stored in the memory 1530 in the workflow manager 1500. The processor 1510 may be implemented as a central processing unit (CPU), a graphics processing unit (GPU), an application processor (AP), and the like equipped in the workflow manager 1500, but the disclosure is not limited thereto.

The communicator 1520 may be connected to another entity by using a communication module such as wired or wireless local area network (LAN), and may transmit or receive data. The communicator 1520 of the workflow manager 1500 according to an embodiment may connect the workflow manager to an NBMP source, a function repository, a media processing task, and a feedback task, and may transmit or receive various types of data.

The memory 1530 is hardware for storing various types of data to be processed in the workflow manager 1500. For example, the memory 1530 may store a plurality of pieces of data received by the communicator 1520, a plurality of pieces of data processed by the processor, and a plurality of pieces of data to be processed by the processor.

The memory 1530 may include a random access memory (RAM) such as a dynamic RAM (DRAM) and a static RAM (SRAM), a read-only memory (ROM), an electrically erasable programmable ROM (EEPROM), a compact disc (CD) ROM (CD-ROM), a Blu-ray or other optical disc storage, a hard disk drive (HDD), a solid state drive (SSD), or a flash memory.

The methods according to the embodiments of the disclosure as described in claims or specification may be implemented as hardware, software, or a combination of hardware and software.

When implemented as software, a computer-readable storage medium or a computer program product which stores one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the disclosure, the term "computer program product" or "computer-readable recording medium" is used to collectively refer to media such as a memory, a hard disk installed in a hard disk drive, and signals. The "computer program product" or "computer-readable recording medium" is a means to be provided to a software computer system including instructions for setting the length of a timer for receiving missing data packets, based on a network metric corresponding to a determined event according to the disclosure.

The computer-readable storage medium may be provided in the form of a non-transitory storage medium. Here, the term 'non-transitory storage medium' means that the storage medium is a tangible entity and does not include a signal (e.g., an electromagnetic wave), and the term does not distinguish that data is stored semi-permanently or temporarily on the storage medium. For example, the non-transitory storage medium may include a buffer in which data is temporarily stored.

According to an embodiment, a method according to various embodiments of the disclosure may be provided in a computer program product. The computer program product may be traded between a seller and a purchaser as a commodity. The computer program product may be distributed in the form of a machine-readable storage medium (e.g., CD-ROM), or may be distributed online (e.g., downloaded or uploaded) through an application store (e.g., Play Store™) or directly between two user devices (e.g., smart phones). For online distribution, at least a part of the computer program product (e.g., a downloadable app.) may be temporarily generated or be at least temporarily stored in a machine-readable storage medium such as a manufacturer's server, an application store's server, or a memory of a relay server.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Specific embodiments of the disclosure are described in the descriptions of the disclosure, but it will be understood that various modifications may be made without departing the scope of the disclosure. Thus, the scope of the disclosure is not limited to the embodiments described herein and should be defined by the appended claims and their equivalents.

The invention claimed is:

1. A media content processing management method, the method comprising:
   obtaining, from a network based media processing (NBMP) source, workflow information for media content processing;
   identifying whether to use a feedback task, based on the workflow information;
   obtaining, from a function repository, function information about a function of the feedback task or about a function of at least one media task for the media content processing, based on the workflow information;
   obtaining task information based on at least one of the workflow information and the function information;
   delivering the task information to each of tasks;
   obtaining client feedback information; and
   updating the task information based on the client feedback information,
   wherein the task information comprises at least one of input information, output information, configuration information, or connection information of each of the tasks, and
   wherein the connection information comprises connection information of a media processing task and the feedback task, the media processing task using client assistance information from among the at least one media task.

2. The media content processing management method of claim 1, wherein the obtaining of the client feedback information comprises receiving the client feedback information from the feedback task.

3. The media content processing management method of claim 2, further comprising delivering the updated task information to the media processing task to use the client assistance information.

4. The media content processing management method of claim 3,
   wherein the obtaining of the client feedback information comprises receiving, from the NBMP source, workflow information updated based on the client feedback information, and
   wherein the updating of the task information comprises updating the task information, based on the updated workflow information.

5. A media content provision system comprising:
   a network based media processing (NBMP) source;
   an NBMP sink;
   a workflow manager configured to manage a workflow for media content processing;
   a function repository configured to store a function of tasks for the media content processing; and
   a media processing entity configured to execute at least one task for the media content processing,
   wherein the workflow manager is configured to:
      obtain, from the NBMP source, workflow information for media content processing,
      identify whether to use a feedback task, based on the workflow information,
      obtain, from a function repository, function information about a function of the feedback task or about a function of at least one media task for the media content processing, based on the workflow information,
      obtain task information based on at least one of the workflow information and the function information,
      deliver the task information to each of tasks,
      obtain client feedback information, and
      update the task information based on the client feedback information,
   wherein the task information comprises at least one of input information, output information, configuration information, or connection information of each of the tasks, and
   wherein the connection information comprises connection information of a media processing task and the feedback task, the media processing task using client assistance information from among the at least one media task.

6. The media content provision system of claim 5, wherein the feedback task is configured to:
   obtain client feedback information from the NBMP source, and
   deliver the obtained client feedback information to the workflow manager and a media processing task to use the client assistance information.

7. The media content provision system of claim 5, wherein the feedback task is configured to:
   obtain client feedback information from the NBMP source, and
   deliver the obtained client feedback information to the workflow manager, and
   wherein the workflow manager is configured to deliver the updated task information to a media processing task to use the client assistance information.

8. The media content provision system of claim 5, wherein the feedback task is configured to deliver the obtained client feedback information to the NBMP source, and wherein the workflow manager is configured to:
receive, from the NBMP source, workflow information updated based on the client feedback information,
update the task information, based on the updated workflow information, and
deliver the updated task information to a media processing task to use the client assistance information.

9. A media content processing management apparatus for managing a workflow for media content processing, the media content processing management apparatus comprising:
a memory;
a communicator; and
a processor,
wherein the processor is configured to:
obtain, from a network based media processing (NBMP) source, workflow information for media content processing,
identify whether to use a feedback task, based on the workflow information,
obtain, from a function repository, function information about a function of the feedback task or about a function of at least one media task for the media content processing, based on the workflow information,
obtain task information based on at least one of the workflow information and the function information,
deliver the task information to each of tasks,
obtain client feedback information, and
update the task information based on the client feedback information,
wherein the task information comprises at least one of input information, output information, configuration information, or connection information of each of the tasks, and
wherein the connection information comprises connection information of a media processing task and the feedback task, the media processing task using client assistance information from among the at least one media task.

10. The media content processing management apparatus of claim 9, wherein the processor is configured to receive the client feedback information from the feedback task.

11. The media content processing management apparatus of claim 10, wherein the processor is configured to deliver the updated task information to the media processing task to use the client assistance information.

12. The media content processing management apparatus of claim 11, wherein the processor is configured to:
receive, from the NBMP source, workflow information updated based on the client feedback information, and
update the task information, based on the updated workflow information.

13. A non-transitory computer-readable recording medium having recorded thereon a computer program for executing the method of claim 1.

\* \* \* \* \*